Feb. 15, 1949.　　　L. F. BLATT　　　2,461,716
ADJUSTABLE DRILL GUIDE AND PILOT
Filed March 31, 1947

INVENTOR.
LELAND F. BLATT
BY
J. S. Murray
ATTORNEY

Patented Feb. 15, 1949

2,461,716

UNITED STATES PATENT OFFICE 2,461,716

ADJUSTABLE DRILL GUIDE AND PILOT

Leland F. Blatt, Detroit, Mich.

Application March 31, 1947, Serial No. 738,355

1 Claim. (Cl. 77—55)

This invention relates to guides for drill bits, and particularly guides which also exercise a pilot function.

It is common in the use of drills, both of the press and portable type, to provide a tubular guide projecting from the drill, to receive a bit in proximity to the work and resist flexing and weaving of the bit, and it has further been proposed to form a pilot extremity on such a guide and to insert such extremity in an opening of a drill plate, set against the work, to predetermine the location of drilled holes in the work. While such constructions are desirable and are a factor in reducing breakage of bits, they fail to establish a maximum safeguard against damage to bits, since they do not sufficiently regulate the effective stroke of a bit according to the requirements of any certain job. When a piece of work is to be drilled with a certain pattern of through holes, there is usually used a backing plate or support underlying the work as well as a drill plate against the exposed face of the work. Unless the effective stroke is nicely regulated, the bit will encounter the support upon breaking through the work, this tending to dull the bit, and quite commonly the bit embeds itself in the support and is broken, unless quite carefully retracted.

The object of the invention is to provide a drill guide that may be adjusted to accurately predetermine the effective stroke of the drill bit, so that the latter may be safeguarded from contact with any support underlying the work.

Another object is to provide an accurately adjustable drill guide suited for a piloting engagement in a pattern-forming drill plate disposed against the work.

Another object is to adapt a drill guide to occupy an abutting relation to a piece of work while a bit positioned by said guide enters the work and to provide in a novel manner for restraint of the guide from rotation.

These and various other objects are attained by the construction hereinafter described and illustrated in the accompanying drawing, wherein.

Figure 3:
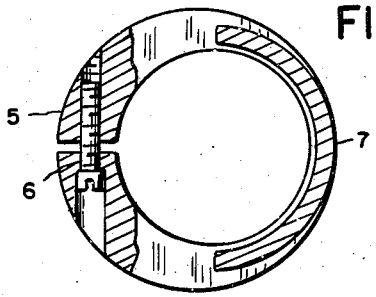
Fig. 3 is a cross sectional view taken on the line 3—3 of Fig. 2.

In these views, the reference character 1 designates a drill frame, 2 a shaft journaled in said frame and usually driven by an electric motor (not shown) and 3 an ordinary chuck carried by the shaft 2 for gripping and driving a bit 4. My improved pilot and guide comprises a split collar 5 adapted to be clamped on the frame 1 by a screw 6, an arm 7 integrally projecting from said collar alongside the chuck, a head 8 on the front end of the arm 7, projecting across the front end of the chuck, and an elongated tubular member 9 rigidly forwardly projecting from the head 8 and coaxial with the bit 4. The head 8 has an opening 10 accommodating the bit and affording it clearance. Slidable in the member 9 is the rear portion of a tubular guide 11 for the bit, and a spring 12 housed within the member 9 reacts between the head 8 and said guide to urge the guide forwardly, to a position in which its front end adjoins the front end of the bit. A key 13 set into an elongated recess exteriorly formed in the member 9 has an inturned forward end 13a projecting into a slot 14 longitudinally extending in the guide 11. This key limits response of the guide to the spring 12 and also restrains the guide from rotation.

Figure 2:
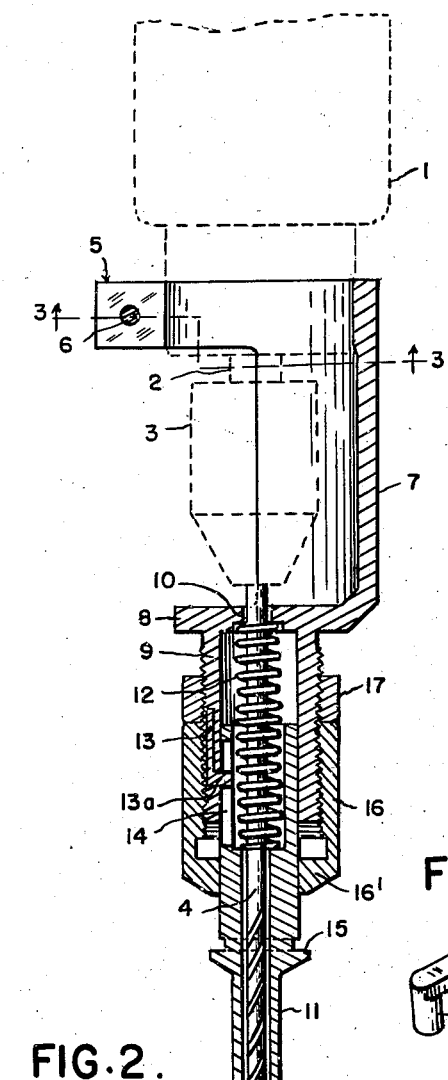
Fig. 2 is an axial sectional view of the same, as applied to a drill, and in operative relation to a piece of work.
Figure 4:
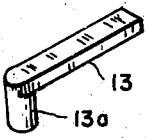
Fig. 4 is a perspective view of a key used to interlock certain parts of the construction.
Figure 1:
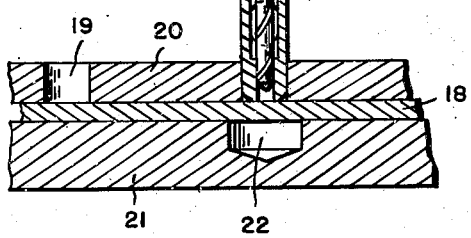
Fig. 1 is a side elevational view of my improved guide and pilot.

At a suitable distance from its ends, the guide 11 is formed with an exterior annular shoulder 15 for engaging a nut 16 threaded on the member 9, the nut having an interior annular flange 16' at its front end for contact by said shoulder. By suitably adjusting the nut 16, the retraction afforded the guide 11 may be regulated. A locknut 17 on the member 9 is adapted to firmly secure the nut 16 in any position of adjustment. As is apparent from Fig. 2, the nut 16 retains the key 13 in its use position.

At 18 is shown a sheet of metal or other material requiring a plurality of drilled holes and a predetermined pattern for such holes is established by openings 19 in a drill plate 20 held in any desired manner against the sheet 18. Against the opposite face of said sheet is set a backing plate or other support 21 and it is usual to form such support with recesses 22 or other clearance openings for the drill bit.

Preliminary to use of a drill equipped with the described guide for the bit, the nut 16 is adjusted to afford the bit a travel adequate to cut through the work without excess motion. The forward end of the guide is then inserted in one of the openings 19 of the drill plate, and the bit is fed through the work by advancing the frame 1 and chuck 3, the guide 11 abutting the work and acting as a pilot for the drill. Immediately after a hole has been drilled, the nut 16 encounters the shoulder 15, preventing further advance of the bit. The latter consequently cannot strike or penetrate the work support 21 and can neither damage such support nor be damaged thereby. Pattern drilling, such as has been described, is usually performed by persons having very little skill or mechanical ability, and the result heretofore has been a considerable breakage of bits due to driving the drill too deep. By permitting the stroke to be accurately regulated, the present invention eliminates damaging or breaking drills due to such unskilled workmanship.

What I claim is:

In a drill guide, the combination with a drilling tool and a bit driven by such tool, of an attachment comprising an elongated tubular guide member in which the bit is rotatable, such member having a work-engaging extremity, a support for said guide member elongated axially of said tool and having a rear end portion fixed on a non-rotating portion of said tool and having a tubular front end portion in which said guide member is slidable, a spring reacting between the support and tubular guide member to urge the guide member toward the point of the bit, a stop element exteriorly carried by said guide member, and a companion stop element carried by said support adjustable to and from the stop element on the guide member to selectively limit the effective stroke of the bit, a key set into said support, said guide member being longitudinally slotted to receive a portion of said key, whereby the guide member is restrained from rotation, said key being covered by and retained in its use position by said adjustable stop element.

LELAND F. BLATT.

REFERENCES CITED

The following references are of record in the file of this patent:

UNITED STATES PATENTS

| Number | Name | Date |
| --- | --- | --- |
| 2,335,614 | Spievak | Nov. 30, 1943 |
| 2,339,324 | Fischer | Jan. 18, 1944 |
| 2,401,490 | Little | June 4, 1946 |
| 2,402,353 | Trautmann | June 18, 1946 |
| 2,409,377 | Miller | Oct. 15, 1946 |

FOREIGN PATENTS

| Number | Country | Date |
| --- | --- | --- |
| 22,542 | Denmark | Oct. 22, 1917 |
| 510,482 | Great Britain | Aug. 2, 1939 |